(12) United States Patent
Wang

(10) Patent No.: US 11,070,341 B2
(45) Date of Patent: Jul. 20, 2021

(54) ROBUST DATA TRANSMISSION METHOD IN INTERNET OF THINGS

(71) Applicant: SHENZHEN POLYTECHNIC, Guangdong (CN)

(72) Inventor: Yang Wang, Guangdong (CN)

(73) Assignee: SHENZHEN POLYTECHNIC, Shenzhen (CN)

(*) Notice: Subject to any disclaimer, the term of this patent is extended or adjusted under 35 U.S.C. 154(b) by 0 days.

(21) Appl. No.: 16/987,607

(22) Filed: Aug. 7, 2020

(65) Prior Publication Data
US 2020/0366443 A1 Nov. 19, 2020

Related U.S. Application Data

(63) Continuation of application No. PCT/CN2019/122992, filed on Dec. 4, 2019.

(30) Foreign Application Priority Data

Dec. 25, 2018 (CN) .......................... 201811589903.2

(51) Int. Cl.
*H04L 5/00* (2006.01)
*H04L 27/26* (2006.01)
*H04W 72/04* (2009.01)

(52) U.S. Cl.
CPC ........ *H04L 5/0053* (2013.01); *H04L 27/2613* (2013.01); *H04W 72/042* (2013.01); *H04W 72/0446* (2013.01)

(58) Field of Classification Search
CPC .............. H04L 5/0053; H04L 27/2613; H04L 72/0446; H04L 5/0005; H04L 27/161; H04L 27/2627
See application file for complete search history.

(56) References Cited

U.S. PATENT DOCUMENTS 10,104,645 B2 10/2018 Li et al.
2012/0082130 A1 4/2012 Xue et al.
(Continued)

FOREIGN PATENT DOCUMENTS

CN 102158901 A 8/2011
CN 103415051 A 11/2013
(Continued)

*Primary Examiner* — Faruk Hamza
*Assistant Examiner* — Abusayeed M Haque

(57) ABSTRACT

A robust data transmission method in Internet of Things. Allocation information of a first time-frequency resource set and a description of a first transmission mode are sent by a base station to a first terminal, and a second time-frequency resource set is allocated by the base station to a second terminal. The first time-frequency resource set includes an overlapping resource set and a non-empty third time-frequency resource set. A second transmission mode of the first data packet is determined by the base station according to a continuity in time of resources in the third time-frequency resource set. A description of the overlapping resource set is sent by the base station to the first terminal. The second transmission method of the first data packet is confirmed by the first terminal, and the first data packet is received by the first terminal according to the first transmission mode and/or the second transmission mode.

18 Claims, 3 Drawing Sheets

(56) References Cited

U.S. PATENT DOCUMENTS

| | | | |
|---|---|---|---|
| 2013/0265955 A1* | 10/2013 | Kim | H04W 72/02 |
| | | | 370/329 |
| 2015/0038143 A1 | 2/2015 | Kilpatrick, II et al. | |
| 2017/0265214 A1 | 9/2017 | Hessler et al. | |
| 2018/0076866 A1* | 3/2018 | Chen | H04J 13/0003 |
| 2018/0367253 A1* | 12/2018 | Nammi | H04L 1/08 |
| 2019/0045569 A1* | 2/2019 | Abedini | H04W 72/0473 |
| 2019/0090126 A1* | 3/2019 | Hayashi | H04W 72/0446 |
| 2019/0229879 A1* | 7/2019 | Yi | H04L 5/0082 |
| 2020/0170076 A1* | 5/2020 | Saito | H04W 80/08 |
| 2020/0204314 A1* | 6/2020 | Kang | H04L 27/2613 |

FOREIGN PATENT DOCUMENTS

| | | |
|---|---|---|
| CN | 103857051 A | 6/2014 |
| CN | 105979597 A | 9/2016 |
| CN | 106686617 A | 5/2017 |
| CN | 107027179 A | 8/2017 |
| CN | 107222926 A | 9/2017 |
| CN | 108667579 A | 10/2018 |
| CN | 108781158 A | 11/2018 |
| WO | 2017095277 A1 | 6/2017 |

* cited by examiner

ROBUST DATA TRANSMISSION METHOD IN INTERNET OF THINGS

CROSS-REFERENCE TO RELATED APPLICATIONS

This application is a continuation of International Patent Application No. PCT/CN2019/122992 with a filing date of Dec. 4, 2019, which claims the benefit of priority from Chinese Patent Application No. 201811589903.2 with a filing date of Dec. 25, 2018. The content of the aforementioned applications, including any intervening amendments thereto, is incorporated herein by reference.

TECHNICAL FIELD

The present application relates to data transmission, and more particularly to a robust data transmission method in Internet of Things.

BACKGROUND 5G ($5^{th}$-generation mobile network) can meet people's diverse business needs in various areas such as residential area, working area, leisure area and traffic area. Even in the scenes with characteristics of ultra-high traffic density, ultra-high connection density or ultra-high mobility, such as dense residential areas, offices, stadiums, outdoor gatherings, subways, expressways, high-speed trains and wide-area coverage, 5G can also ensure the ultimate business experience in terms of ultra-high-definition video, virtual reality (VR), augmented reality (AR), cloud desktop and online games. Moreover, 5G will further penetrate into the Internet of Things and various industries to be deeply integrated with industrial facilities, medical instruments and vehicles, thereby effectively meeting diverse business needs of vertical industries such as industry, medical industry and transportation to achieve a real sense of "Internet of Everything".

5G application scenarios can be divided into two categories: Mobile Broadband (MBB) and Internet of Things (IoT), in which the Mobile Broadband access is mainly required to have high capacity to provide high data transmission rate to meet the growing demand of data services. The Internet of Things is mainly driven by the demands of Machine Type Communication (MTC), and it can be further divided into two types, including low-rate Massive Machine Communication (MMC) and low-latency and high-reliability machine communication. The low-rate MMC involves low-rate access to massive nodes, so that the transmitted data packets are generally small and the time intervals are relatively long, resulting in low cost and power consumption. The low-latency and high-reliability machine communication is mainly applied to the machine communication with high real-time and reliability requirements, such as real-time alerting and real-time monitoring.

In the $5^{th}$-generation mobile communication system, the core scenario that needs to be studied in depth most is machine communication, such as Industry 4.0, Internet of vehicles and robots, and when an overlap occurs in the time-frequency resources used in data from different businesses, how to ensure a robust transmission between data from different businesses is a problem that needs to be solved urgently.

SUMMARY

An object of the disclosure is to provide a robust data transmission method in Internet of Things to solve the problem in the existing machine communication that the data transmission has poor reliability when an overlap occurs in the time-frequency resources used in different business data.

Technical solutions of the disclosure are described as follows.

The disclosure provides a robust data transmission method in Internet of Things, comprising:

(1) sending, by a base station, allocation information of a first time-frequency resource set and a description of a first transmission mode to a first terminal; wherein the description of the first transmission mode comprises: a position of a first demodulation reference signal, a modulation and coding mode of a first data packet or a number of transmission layers of the first data packet, or a combination thereof;

(2) allocating, by the base station, a second time-frequency resource set to a second terminal, wherein there is an overlapping resource set between the second time-frequency resource set and the first time-frequency resources, and an overlapping portion therein is called a set of overlapping resource set; resources included in the first time-frequency resource set in frequency domain are a subset of resources included in the second time-frequency resource set in the frequency domain; and the first time-frequency resource set comprises the overlapping resource set and a non-empty third time-frequency resource set.

(3) determining, by the base station, a second transmission mode of the first data packet according to a continuity in time of resources in the third time-frequency resource set, and sending, by the base station, the first data packet to the first terminal according to the first transmission mode and/or the second transmission mode; wherein a description of the second transmission mode comprises: a position of a second demodulation reference signal, a modulation and coding mode of the first data packet on different time domain symbols, a multiple-input and multiple-output transmission mode of the first data packet in the different time domain symbols, a division method of the first data packet, a transmission power of the first data packet in the different time domain symbols, or a determination whether a fourth time-frequency resource set is provided for sending the first data packet, or a combination thereof;

(4) sending, by the base station, a description of the overlapping resource set to the first terminal;

(5) confirming, by the first terminal, the second transmission mode of the first data packet according to the description of the overlapping resource set, and receiving, by the first terminal, the first data packet according to the first transmission mode and/or the second transmission mode; and (6) if the first terminal fails to receive the description of the overlapping resource set, and fails to receive the first data packet in the first time-frequency resource set, merging, by the first terminal, information received in the first time-frequency resource set with information received in the fourth time-frequency resource set to obtain the first data packet via the first terminal.

In an embodiment, a transmission of the description of the overlapping resource set is performed after a transmission of the third time-frequency resource set is completed, so as to reduce a computational complexity of the first terminal as much as possible to avoid parallel processing of a decoding of multiple control channels and a decoding of data channels.

In an embodiment, in step (3), if the third time-frequency resource set is continuous in time domain and starts from a starting position of a time domain of the first time-frequency resource set, the base station sends the first data packet in the third time-frequency resource set using the first transmission mode.

In an embodiment, in step (3), if the third time-frequency resource set is continuous in time domain and does not start from a starting position of a time domain of the first time-frequency resource set, the base station sends the first data packet in the third time-frequency resource set using the second transmission mode.

In an embodiment, if there is only one symbol to transmit the first demodulation reference signal through the first transmission mode, and the first demodulation reference signal is located in the starting position of the time domain of the first time-frequency resource set, the second demodulation reference signal in the second transmission mode is located at a starting position of a time domain of the third time-frequency resource set.

In an embodiment, if a ratio of a number of resources included in the first time-frequency resource set to a number of resources included in the third time-frequency resource set is X:1, a power for transmitting the first data packet using the second transmission method in a single source of the third time-frequency resource set is X times the magnitude of a power for transmitting the first data packet using the first transmission method in a single resource of the first time-frequency resource set, and resources occupied by the second demodulation reference signal of the second transmission mode is ½X times the number of resources occupied by the first demodulation reference signal in the first transmission mode, where X is a natural number greater than 0. Since the failure in using the overlapping time-frequency resource set to transmit information of the first data packet will lead to a decrease in the performance of the first terminal to demodulate the first data packet, several approaches such as increasing transmission power and reducing a density of the demodulation reference channels are used herein to improve the demodulation performance of the remaining part.

In an embodiment, if X is less than 4, a modulation and coding mode corresponding to the second transmission mode is the same as a modulation and coding mode corresponding to the first transmission mode; and if X is greater than or equal to 4, the modulation and coding mode corresponding to the second transmission mode is (1+X/2) times the spectral efficiency of the modulation and coding mode corresponding to the first transmission method. Since the performance of the first terminal to receive the first data packet is greatly influenced when there are too many overlapping resources, a method of increasing the spectrum efficiency is carried out to effectively reduce the influence.

In an embodiment, in step (3), if the third time-frequency resource set is discontinuous in the time domain, and consists of a time-frequency resource subset A and a time-frequency resource subset B, the base station divides the first data packet into a sub-data packet Data-A and a sub-data packet Data-B; the base station sends the sub-data packet Data-A using the first transmission method, and transmits the sub-data packet Data-B using the second transmission method; wherein each of the time-frequency resource subsets A and B is continuous in the time domain, and carries the second demodulation reference signal.

In an embodiment, wherein in the case that the third time-frequency resource set is continuous in the time domain, and comprises a time-frequency resource subset A and a time-frequency resource subset B, if a ratio of a number of resources included in the third time-frequency resource set excluding the time-frequency resource subset A to a number of resources included in the time-frequency resource subset B is Y:1, a power for transmitting the sub-data packet Data-B using the second transmission method in a single source of the time-frequency resource subset B is Y times a power for transmitting the sub-data packet Data-A using the first transmission method in a single resource of the time-frequency resource subset B. After recognizing that the overlapping resource set cannot be used to transmit the first data packet to the first terminal, the base station increases the transmission power of the time-frequency resource subset B, which follows the overlapping resource set in a time domain, to reduce an influence of failing to use the overlapping resource set to transmit data.

In an embodiment, if Y is less than 4, a modulation and coding mode corresponding to the second transmission mode is the same as a modulation and coding mode corresponding to the first transmission mode, and a number of transmission layers corresponding to the second transmission mode is twice a number of transmission layers corresponding to the first transmission mode; if Y is greater than or equal to 4, the modulation and coding mode corresponding to the second transmission mode is (1+Y/2) times the spectral efficiency of the modulation and coding mode corresponding to the first transmission mode, and the number of transmission layers corresponding to the second transmitting mode is the same as the number of transmission layers corresponding to the first transmitting mode.

In an embodiment, a ratio of a number of resources included in the first time-frequency resource set to a number of resources included in the third time-frequency resource set is Z:1; if Z is greater than or equal to 3 and a number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set, so that it is beneficial for using the spread-spectrum codeword to allow multiple terminals to share related resources and improve an efficiency of resource use as much as possible, wherein Z and S are both natural numbers greater than 0.

Compared to the prior art, the disclosure has the following beneficial effects.

The present disclosure provides a robust data transmission method in Internet of Things, which effectively solves the technical problem in the existing machine communication that the data transmission has poor reliability when an overlap occurs in the time-frequency resources used in different business data, greatly improving the transmission performance and the use efficiency of the network.

BRIEF DESCRIPTION OF THE DRAWINGS

In order to explain the embodiments of the present disclosure or the technical solutions in the prior art more clearly, the accompany drawings involved in the description of the embodiments of the disclosure or the prior art will be briefly described below. Obviously, described below in the accompany drawings are only some embodiments of the present disclosure, and those of ordinary skill in the art can obtain other drawings according to the structures shown in the following drawings without paying any creative efforts.

DETAILED DESCRIPTION OF EMBODIMENTS

The present disclosure will be further described in detail below with reference to the accompanying drawings and embodiments.

Figure 1:
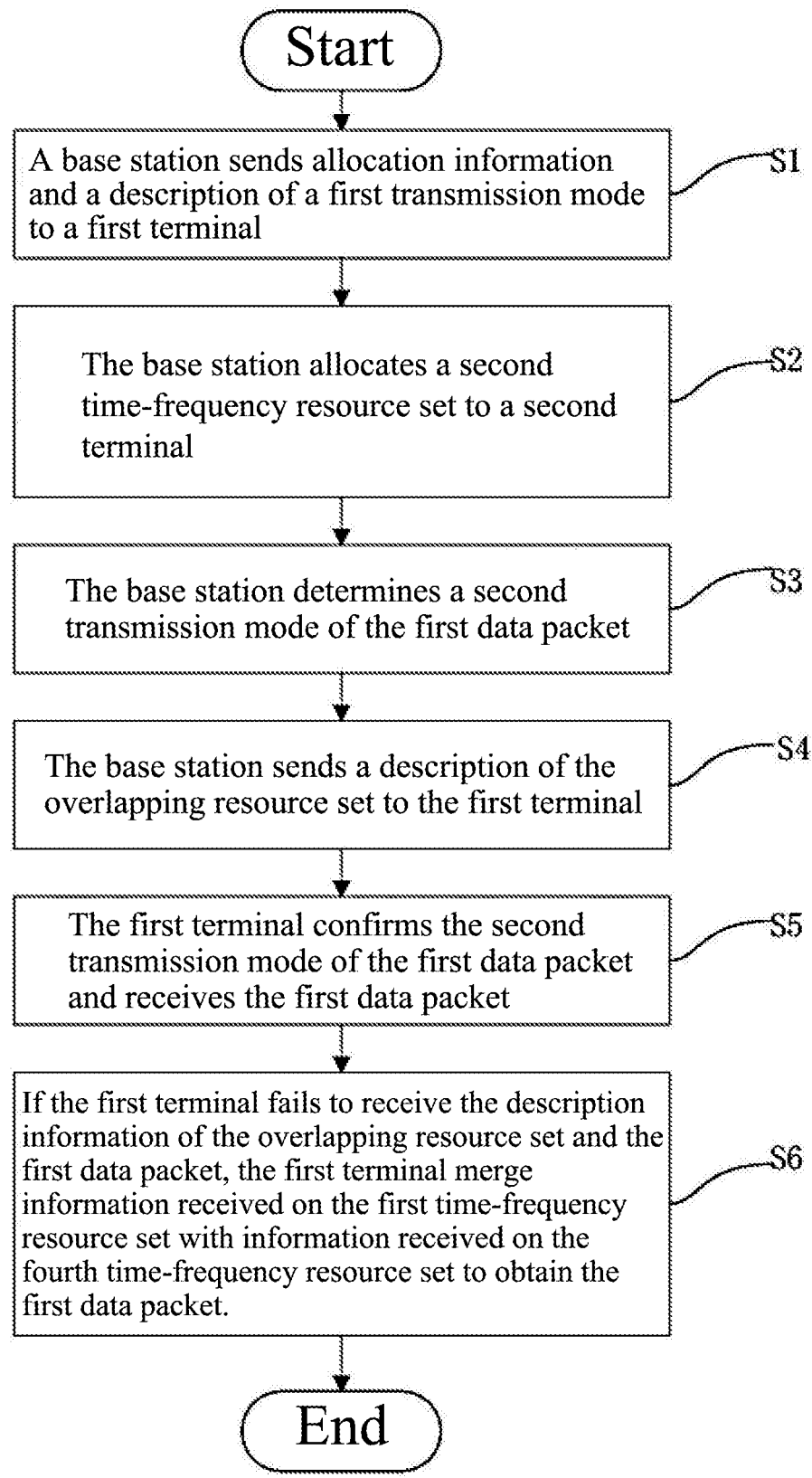
FIG. 1 is a flowchart of a robust data transmission method in Internet of Things according to the present disclosure.

As shown in FIG. 1, the present disclosure provides a robust data transmission method in Internet of Things, which is specifically described as follows.

(1) Allocation information of a first time-frequency resource set and a description of a first transmission mode are sent by a base station to a first terminal. The description of the first transmission mode includes: a position of a first demodulation reference signal, a modulation and coding mode of a first data packet or a number of transmission layers of the first data packet, or a combination thereof.

(2) A second time-frequency resource set is allocated by the base station to a second terminal. There is an overlapping resource set between the second time-frequency resource set and the first time-frequency resource set; resources included in the first time-frequency resource set in the frequency domain are a subset of resources included in the second time-frequency resource set in the frequency domain, and the first time-frequency resource set includes the overlapping resource set and a non-empty third time-frequency resource set.

(3) A second transmission mode of the first data packet is determined by the base station according to a continuity in time of resources in the third time-frequency resource set, and the first data packet is transmitted to the first terminal according to the first transmission mode and/or the second transmission mode. A description of the second transmission mode includes: a position of a second demodulation reference signal, a modulation and coding mode of the first data packet in different time domain symbols, a multiple-input and multiple-output transmission mode of the first data packet in the different time domain symbols, a division method of the first data packet, a transmission power of the first data packet in the different time domain symbols, or a determination whether a fourth time-frequency resources is provided for transmitting the first data packet, or a combination thereof.

(4) A description of the overlapping resource set is sent by the base station to the first terminal. A transmitting time of the description of the overlapping resource set is after a transmitting end time of the third time-frequency resource set, so as to reduce a computational complexity of the first terminal as much as possible to avoid parallel processing of a decoding of multiple control channels and a decoding of data channels.

(5) The first terminal confirms the second transmission mode of the first data packet according to the description information of the overlapping resource set, and receives the first data packet according to the first transmission mode and/or the second transmission mode.

(6) If the first terminal fails to receive the description information of the set of overlapping resources and fails to receive the first data packet in the first set of time-frequency resources, information received in the first time-frequency resource set with information received in the fourth time-frequency resource set is merged by the first terminal to obtain the first data packet.

The embodiments described below will illustrate the present disclosure in details.

Embodiment 1

In the embodiment, the base station sends allocation information of the first time-frequency resource set and the description of the first transmission mode to the first terminal, where the description of the first transmission mode includes a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

Figure 2:
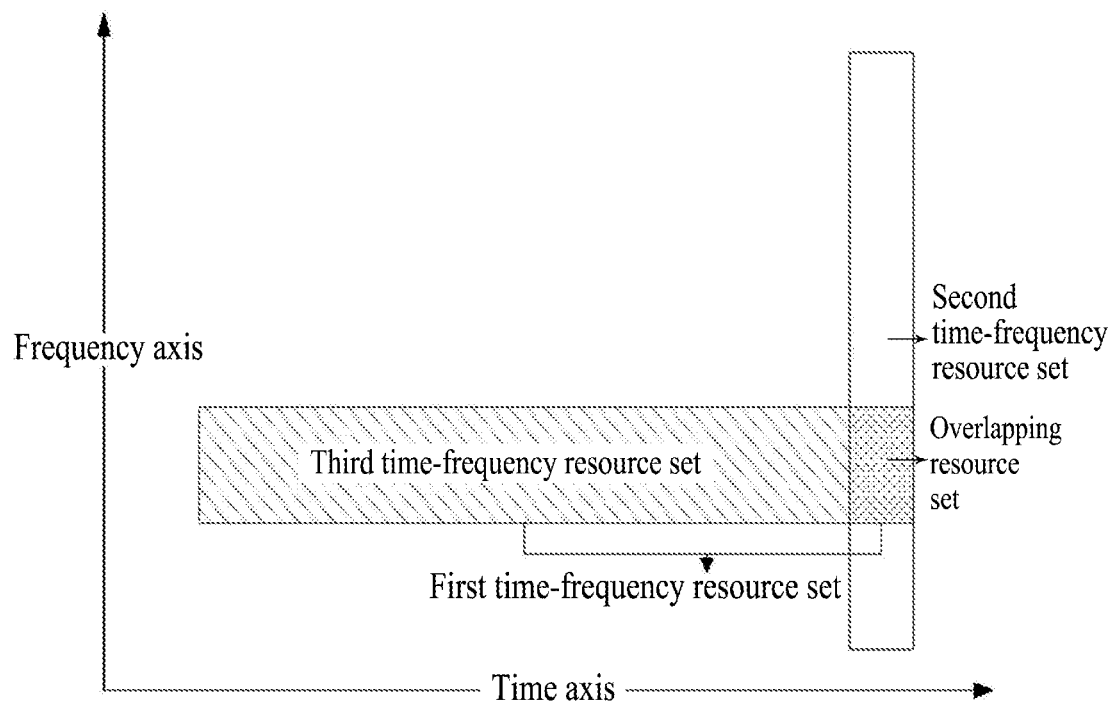
FIG. 2 schematically shows a relationship among a first time-frequency resource set, a second time-frequency resource set, an overlapping resource set and a third time-frequency resource set according to a first embodiment of the present disclosure.
Figure 3:
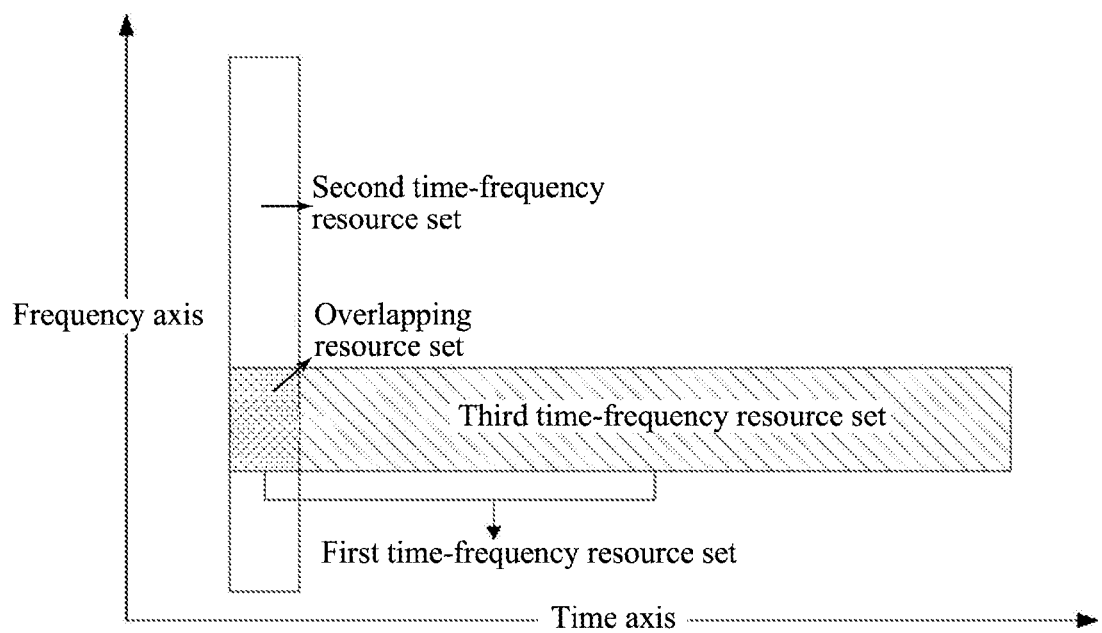
FIG. 3 schematically shows a relationship between the first time-frequency resource set, the second time-frequency resource set, the overlapping resource set and the third time-frequency resource set according to a second embodiment of the present disclosure.
Figure 4:
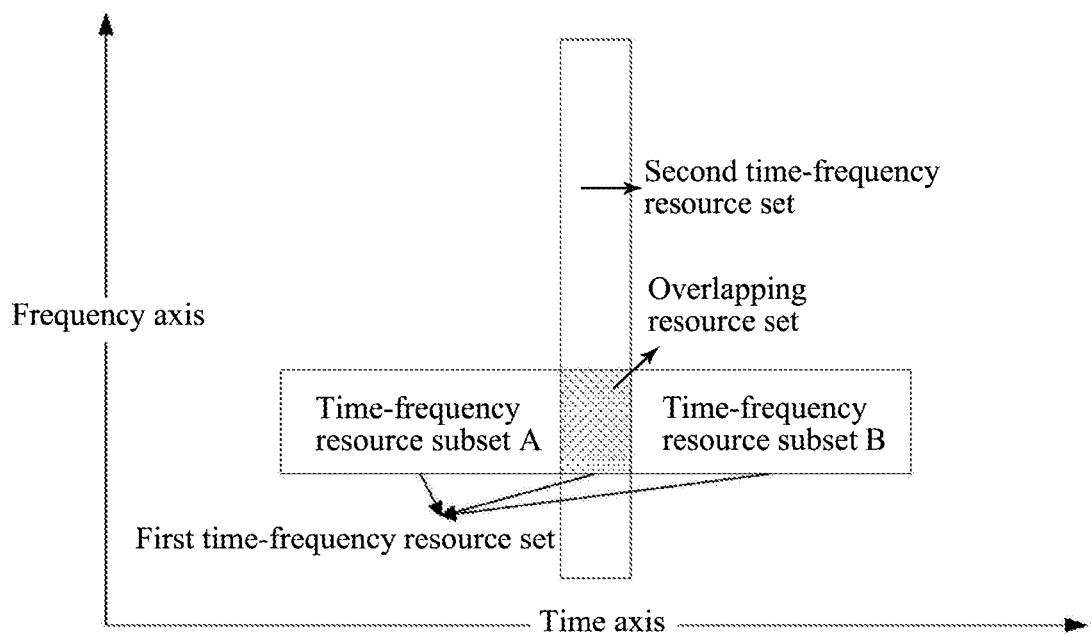
FIG. 4 schematically shows a relationship between the first time-frequency resource set, the second time-frequency resource set, the overlapping resource set and the third time-frequency resource set according to a third embodiment of the present disclosure.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

The base station determines the second transmission mode of the first data packet according to the continuity in time of resources in the third time-frequency resource set, and transmits the first data packet to the first terminal according to the first transmission mode and/or the second transmission mode; where the description of the second transmission mode includes the position of the second demodulation reference signal, a modulation and coding mode of the first data packet in different time domain symbols, the multi-input and multi-output transmission mode of the first data packet in different time domain symbols, the division method of the first data packet, the transmission power of the first data packet in different time domain symbols or the determination whether the fourth time-frequency resource set is provided for transmitting the first data packet, or a combination thereof.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description, and receives the first data packet according to the first transmission mode and/or the second transmission mode. If failing to receive the description (meaning that the first terminal recognizes that the base station uses all resources in the first time-frequency resource set to transmit the first data packet), and failing to receive the first data packet in the first time-frequency resource set, the first terminal merges information received in the first time-frequency resource set with information received in the fourth time-frequency resource set to try to obtain the first data packet.

Embodiment 2

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource overlaps with the first time-frequency resource set (the overlapping part is called an overlapping resource set). The resources included in the first time-frequency resource in the frequency domain are a subset of resources included in the second time-frequency resource set in the frequency domain. The first time-frequency resource set is composed of the overlapping resource set and the non-empty third time-frequency resource set.

As shown in FIG. 2, if the third time-frequency resource set is continuous in time domain and starts from a starting position of a time domain of the first time-frequency resource set, the base station sends the first data packet in the third time-frequency resource set using the first transmission mode.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description information, and receives the first data packet according to the first transmission mode. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 3

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

As shown in FIG. 3, if the third time-frequency resource set is continuous in time domain and does not start from a starting position of a time domain of the first time-frequency resource set, the base station sends the first data packet in the third time-frequency resource set using the first transmission mode.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description information, and receives the first data packet according to the second transmission mode. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 4

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

As shown in FIG. 3, if the third time-frequency resource set is continuous in time domain and does not start from a starting position of a time domain of the first time-frequency resource set, the base station sends the first data packet in the third time-frequency resource set using the first transmission mode. Preferably, if there is only one symbol to transmit the first demodulation reference signal through the first transmission mode, and the first demodulation reference signal is located in the starting position of the time domain of the first time-frequency resource set, the second demodulation reference signal in the second transmission mode is located at a starting position of a time domain of the third time-frequency resource set.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description information, and receives the first data packet according to the second transmission mode. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 5

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T each are a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

As shown in FIG. 3, if the third time-frequency resource set is continuous in time domain and does not start from a starting position of a time domain of the first time-frequency resource set, the base station sends the first data packet in the third time-frequency resource set using the first transmission mode. Preferably, if a ratio of a number of resources included in the first time-frequency resource set to a number of resources included in the third time-frequency resource set is X:1, a power for transmitting the first data packet using the second transmission method in a single source of the third time-frequency resource set is X times the magnitude of a power for transmitting the first data packet using the first transmission method in a single resource of the first time-frequency resource set, and resources occupied by the second demodulation reference signal of the second transmission mode is ½X times the number of resources occupied by the first demodulation reference signal in the first transmission mode. Since information of the first data packet fail to be transmitted using the overlapping time-frequency resource set, leading to a performance degradation of demodulating the first data packet via the first terminal, some methods comprising increasing transmission power and reducing a density of the demodulation reference channel are required to improve the demodulation performance of the remaining part. Besides, X is a natural number greater than 0.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description information, and receives the first data packet according to the second transmission mode. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 6

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

As shown in FIG. 3, if the third time-frequency resource set is continuous in time domain and does not start from a starting position of a time domain of the first time-frequency resource set, the base station sends the first data packet in the third time-frequency resource set using the first transmission mode. Preferably, if a ratio of a number of resources included in the first time-frequency resource set to a number of resources included in the third time-frequency resource set is X:1, and if X is less than 4, a modulation and coding mode corresponding to the second transmission mode is the same as a modulation and coding mode corresponding to the first transmission mode; and if X is greater than or equal to 4, the modulation and coding mode corresponding to the second transmission mode is $(1+X/2)$ times the spectral efficiency of the modulation and coding mode corresponding to the first transmission method. Since the performance of the first terminal receiving the first data packet is greatly influenced when there are too many overlapping resources, a method of increasing the spectrum efficiency is carried out to effectively reduce the influence, where a simulation also shows that this method can reduce the influence by more than 80%. Besides, and X is a natural number greater than 0.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description information, and receives the first data packet according to the second transmission mode. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 7

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

As shown in FIG. 4, if the third time-frequency resource set is discontinuous in the time domain, and consists of a time-frequency resource subset A and a time-frequency resource subset B, the base station divides the first data packet into a sub-data packet Data-A and a sub-data packet Data-B; the base station sends the sub-data packet Data-A using the first transmission method, and transmits the sub-data packet Data-B using the second transmission method; where each of the time-frequency resource subsets A and B is continuous in the time domain, and carries the second demodulation reference signal.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description. The first terminal receives the sub-data packet Data-A using the first transmission method, and receives the sub-data packet Data-B using the second transmission method. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 8

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

As shown in FIG. 4, if the third time-frequency resource set is discontinuous in the time domain, and consists of a time-frequency resource subset A and a time-frequency resource subset B, the base station divides the first data packet into a sub-data packet Data-A and a sub-data packet Data-B; the base station sends the sub-data packet Data-A using the first transmission method, and transmits the sub-data packet Data-B using the second transmission method; where each of the time-frequency resource subsets A and B is continuous in the time domain, and carries the second demodulation reference signal. Preferably, in the case that the third time-frequency resource set is continuous in the time domain, and includes a time-frequency resource subset A and a time-frequency resource subset B, if a ratio of a number of resources included in the third time-frequency resource set excluding the time-frequency resource subset A to a number of resources included in the time-frequency resource subset B is Y:1, a power for transmitting the sub-data packet Data-B using the second transmission method in a single source of the time-frequency resource subset B is Y times the magnitude of a power for transmitting the sub-data packet Data-A using the first transmission method in a single resource of the time-frequency resource subset B. After recognizing that the overlapping resource set cannot be used to transmit the first data packet to the first terminal, the base station increases the power of the time-frequency resource subset B, which is located behind the overlapping resource set in a time domain, to reduce an influence of failing to use the overlapping resource set to transmit data. Besides, Y is a natural number greater than 0.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description. The first terminal receives the sub-data packet Data-A using the first transmission method, and receives the sub-data packet Data-B using the second transmission method. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 9

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

As shown in FIG. 4, if the third time-frequency resource set is discontinuous in the time domain, and consists of a time-frequency resource subset A and a time-frequency resource subset B, the base station divides the first data packet into a sub-data packet Data-A and a sub-data packet Data-B; the base station sends the sub-data packet Data-A using the first transmission method, and transmits the sub-data packet Data-B using the second transmission method; where each of the time-frequency resource subsets A and B is continuous in the time domain, and carries the second demodulation reference signal. Preferably, in the case that the third time-frequency resource set is continuous in the time domain, and includes a time-frequency resource subset A and a time-frequency resource subset B, if a ratio of a number of resources included in the third time-frequency resource set excluding the time-frequency resource subset A to a number of resources included in the time-frequency resource subset B is Y:1, and Y is less than 4, a modulation and coding mode corresponding to the second transmission mode is the same as a modulation and coding mode corresponding to the first transmission mode, and a number of transmission layers corresponding to the second transmission mode is twice a number of transmission layers corresponding to the first transmission mode; if Y is greater than or equal to 4, the modulation and coding mode corresponding to the second transmission mode is (1+Y/2) times the spectral efficiency of the modulation and coding mode corresponding to the first transmission mode, and the number of transmission layers corresponding to the second transmitting mode is the same as the number of transmission layers corresponding to the first transmitting mode, where Y is a natural number greater than 0. Therefore, the spectrum efficiency is improved to minimize the impact that the overlapping resource set fails to transmit data, and the test results have shown that this method can reduce the related impact by more than 75%.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

The first terminal confirms the second transmission mode of the first data packet according to the description. The first terminal receives the sub-data packet Data-A using the first transmission method, and receives the sub-data packet Data-B using the second transmission method. If failing to receive the description of the overlapping resource set, and failing to receive the first data packet in the first set of time-frequency resources, the first terminal merges information received in the first time-frequency resource set with information received in the fourth time-frequency resource set to obtain the first data packet.

Embodiment 10

In the embodiment, the base station sends allocation information of the first time-frequency resource set and description of the first transmission mode to the first terminal, where the description of the first transmission mode includes: a position of a first demodulation reference signal, a modulation and coding mode of a first data packet or a number of transmission layers of the first data packet, or a combination thereof. Specifically, the first data packet is composed of T bits obtained by performing channel coding on B useful bits (refer to the channel coding method of 4G or 5G mobile communication system), where B and T are respectively a natural number greater than 0.

The base station allocates the second time-frequency resource set to a second terminal. As shown in FIGS. 2-4, the second time-frequency resource set overlaps with the first time-frequency resource set (the overlapping part is called an overlapping resource set). The resources included in the first time-frequency resource set in the frequency domain are a subset of resources included in the second time-frequency resource set in the frequency domain. The first time-frequency resource set is composed of the overlapping resource set and the non-empty third time-frequency resource set.

The base station determines the second transmission mode of the first data packet according to the continuity in time of resources in the third time-frequency resource set, and transmits the first data packet to the first terminal according to the first transmission mode and/or the second transmission mode; where the description of the second transmission mode includes the position of the second demodulation reference signal, a modulation and coding mode of the first data packet in different time domain symbols, the multi-input and multi-output transmission mode of the first data packet in different time domain symbols, the division method of the first data packet, the transmission power of the first data packet in different time domain symbols or the determination whether the fourth time-frequency resource set is provided for transmitting the first data packet, or a combination thereof.

The base station sends description of the overlapping resource set to the first terminal, where the transmitting time of the description is after the end time of the third time-frequency resource set, so as to reduce the computational complexity of the first terminal as much as possible, avoiding the parallel processing of the decoding of multiple control channels and the decoding of data channels.

Preferably, a ratio of a number of resources included in the first time-frequency resource set to a number of resources included in the third time-frequency resource set is Z:1; if Z is greater than or equal to 3 and a number of useful bits included in the first data packet is greater than or equal to 2048, the base station uses the fourth time-frequency resource set to transmit a part of data in the first data packet to the first terminal by allocating a spread-spectrum codeword with a length S to the first terminal; where a starting time of the fourth time-frequency resource set is after an end time of the first time-frequency resource set; resources included in the fourth time-frequency resource set is S times the number of resources included in the overlapping resource set; and Z and S are respectively a natural number greater than 0.

The first terminal confirms the second transmission mode of the first data packet according to the description, and receives the first data packet according to the first transmission mode and/or the second transmission mode. If failing to receive the description (meaning that the first terminal recognizes that the base station uses all resources in the first time-frequency resource set to transmit the first data packet), and failing to receive the first data packet in the first time-frequency resource set, the first terminal merges information received in the first time-frequency resource set with information received in the fourth time-frequency resource set to try to obtain the first data packet.

Described above are only preferred embodiments of the present disclosure, which are not intended to limit the present disclosure. It should be noted that all equivalent changes made by those skilled in the art without departing from the spirit of the present disclosure shall fall within the scope of the disclosure defined by the appended claims.

What is claimed is:

1. A robust data transmission method in Internet of Things, comprising:
   (1) sending, by a base station, allocation information of a first time-frequency resource set and a description of a first transmission mode to a first terminal; wherein the description of the first transmission mode comprises a position of a first demodulation reference signal, a modulation and coding mode of a first data packet or the number of transmission layers of the first data packet, or a combination thereof;
   (2) allocating, by the base station, a second time-frequency resource set to a second terminal, wherein there is an overlapping resource set between the second time-frequency resource set and the first time-frequency resource set; resources included in the first time-frequency resource set in frequency domain are a subset of resources included in the second time-frequency resource set in the frequency domain; and the first time-frequency resource set comprises the overlapping resource set and a non-empty third time-frequency resource set;
   (3) determining, by the base station, a second transmission mode of the first data packet according to a continuity in time of resources in the third time-frequency resource set, and sending, by a base station, the first data packet to the first terminal according to the first transmission mode and/or the second transmission mode; wherein a description of the second transmission mode comprises a position of a second demodulation reference signal, a modulation and coding mode of the first data packet in different time domain symbols, a multiple-input and multiple-output transmission mode of the first data packet in the different time domain symbols, a division method of the first data packet, a transmission power of the first data packet in the different time domain symbols or a determination whether a fourth time-frequency resource set is provided for transmitting the first data packet, or a combination thereof;
   (4) sending, by a base station, a description of the overlapping resource set to the first terminal;
   (5) confirming, by the first terminal, the second transmission mode of the first data packet according to the description of the overlapping resource set, and receiving, by the first terminal, the first data packet according to the first transmission mode and/or the second transmission mode; and
   (6) if the first terminal fails to receive the description of the overlapping resource set and fails to receive the first data packet in the first time-frequency resource set, merging, by the first terminal, information received in the first time-frequency resource set with information received in the fourth time-frequency resource set to obtain the first data packet.

2. The robust data transmission method of claim 1, wherein in step (3), if the third time-frequency resource set is continuous in a time domain and starts from a starting position of a time domain of the first time-frequency resource set, the base station sends the first data packet in the third time-frequency resource set using the first transmission mode.

3. The robust data transmission method of claim 1, wherein in step (3), if the third time-frequency resource set is continuous in time domain and does not start from a starting position of a time domain of the first time-frequency resource set, the base station sends the first data packet in the third time-frequency resource set using the second transmission mode.

4. The robust data transmission method of claim 3, wherein if there is only one symbol to transmit the first demodulation reference signal through the first transmission mode, and the first demodulation reference signal is located in the starting position of the time domain of the first time-frequency resource set, the second demodulation reference signal in the second transmission mode is located at a starting position of a time domain of the third time-frequency resource set.

5. The robust data transmission method of claim 3, wherein if a ratio of the number of resources included in the first time-frequency resource set to the number of resources included in the third time-frequency resource set is X:1, a power for transmitting the first data packet using the second transmission method in a single source of the third time-frequency resource set is X times the magnitude of a power for transmitting the first data packet using the first transmission method in a single resource of the first time-frequency resource set, and resources occupied by the second demodulation reference signal of the second transmission mode is ½X times the number of resources occupied by the first demodulation reference signal of the first transmission mode, wherein X is a natural number greater than 0.

6. The robust data transmission method of claim 5, wherein if X is less than 4, a modulation and coding mode corresponding to the second transmission mode is the same as a modulation and coding mode corresponding to the first transmission mode; if X is greater than or equal to 4, the modulation and coding mode corresponding to the second transmission mode is (1+X/2) times the spectral efficiency of the modulation and coding mode corresponding to the first transmission method.

7. The robust data transmission method of claim 1, wherein in step (3), if the third time-frequency resource set is discontinuous in the time domain, and consists of a time-frequency resource subset A and a time-frequency resource subset B, the base station divides the first data packet into a sub-data packet Data-A and a sub-data packet Data-B; the base station sends the sub-data packet Data-A using the first transmission method, and transmits the sub-data packet Data-B using the second transmission method; wherein the time-frequency resource subsets A and B are continuous in the time domain, and respectively carries the first and second demodulation reference signals.

8. The robust data transmission method of claim 1, wherein in the case that the third time-frequency resource set is continuous in the time domain, and comprises a time-frequency resource subset A and a time-frequency resource subset B, if a ratio of the number of resources included in the third time-frequency resource set excluding the time-frequency resource subset A to the number of resources included in the time-frequency resource subset B is Y:1, a power for transmitting the sub-data packet Data-B using the second transmission method in a single source of the time-frequency resource subset B is Y times the magnitude of a power for transmitting the sub-data packet Data-A using the first transmission method in a single resource of the time-frequency resource subset A, wherein Y is a natural number greater than 0.

9. The robust data transmission method of claim 8, wherein if Y is less than 4, a modulation and coding mode corresponding to the second transmission mode is the same as a modulation and coding mode corresponding to the first transmission mode, and the number of transmission layers corresponding to the second transmission mode is twice the number of transmission layers corresponding to the first transmission mode; if Y is greater than or equal to 4, the modulation and coding mode corresponding to the second transmission mode is (1+Y/2) times the spectral efficiency of the modulation and coding mode corresponding to the first transmission mode, and the number of transmission layers corresponding to the second transmitting mode is the same as the number of transmission layers corresponding to the first transmitting mode.

10. The robust data transmission method of claim 1, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

11. The robust data transmission method of claim 2, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

12. The robust data transmission method of claim 3, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

13. The robust data transmission method of claim 4, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

14. The robust data transmission method of claim 5, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

15. The robust data transmission method of claim 6, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

16. The robust data transmission method of claim 7, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

17. The robust data transmission method of claim 8, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

18. The robust data transmission method of claim 9, wherein a ratio of the number of resources included in the first time-frequency resource set to the number of resources included in the third time-frequency resource set is Z:1; if Z is greater than or equal to 3 and the number of useful bits included in the first data packet is greater than or equal to 2048, the base station uses the fourth time-frequency resource set to transmit a part of data in the first data packet to the first terminal by allocating a spread-spectrum codeword with a length S to the first terminal; wherein a starting time of the fourth time-frequency resource set is after an end time of the first time-frequency resource set; resources included in the fourth time-frequency resource set is S times the number of resources included in the overlapping resource set; and Z and S are respectively a natural number greater than 0.

* * * * *